United States Patent [19]
Mansel et al.

[11] 4,415,461
[45] Nov. 15, 1983

[54] PROCESS FOR TREATING RESIDUAL WATERS CONTAINING AROMATIC AMINES

[75] Inventors: Jean E. Mansel, Labeuvriere; Charlie M. P. Masson, Mons-en-Baroeul; Paul Bertaux, Saint Andre; Andre M. J. Grosmaitre, Marquette Les Lille, all of France

[73] Assignee: PCUK Produits Chimiques Ugine Kuhlmann, Courbevoie, France

[21] Appl. No.: 455,157

[22] Filed: Jan. 3, 1983

[30] Foreign Application Priority Data

Jan. 15, 1982 [FR] France ................ 82 00565

[51] Int. Cl.$^3$ ............ C02F 1/70; C02F 1/72
[52] U.S. Cl. ................... 210/757; 210/758; 210/766
[58] Field of Search ............ 210/749, 757, 758, 761, 210/762, 763, 766, 719, 720, 721, 722, 737

[56] References Cited

U.S. PATENT DOCUMENTS 3,540,189  11/1970  Siewers ................ 210/758

FOREIGN PATENT DOCUMENTS

| 53-28952 | 3/1978 | Japan | 210/759 |
| 53-100968 | 9/1978 | Japan | 210/758 |
| 53-120100 | 10/1978 | Japan | 210/757 |
| 2027004 | 2/1980 | United Kingdom | 210/903 |
| 2063238 | 6/1981 | United Kingdom | 210/766 |
| 662505 | 5/1979 | U.S.S.R. | 210/903 |

Primary Examiner—Ernest G. Therkorn
Attorney, Agent, or Firm—Beveridge, DeGrandi & Kline

[57] ABSTRACT

A process for destroying primary aromatic amines in residual waters by treating the residual waters containing said amines at a temperature between 40° C. and 90° C. and for a period longer than 5 minutes with a mixture of sulfuric acid and nitric acid or with a mixture of a solution of an alkali metal or ammonium nitrite and an acid, the final pH of the reaction medium being lower than 3.

13 Claims, No Drawings

PROCESS FOR TREATING RESIDUAL WATERS CONTAINING AROMATIC AMINES

The present invention relates to a process for destroying aromatic amines in residual waters.

Certain manufacturing processes involve the byproduction of residual waters containing more than negligible amounts of aminated derivatives which must be eliminated because of their toxicity, before the waters are discharged to nature.

Various processes have been suggested, for example, adsorption on active charcoal in a fixed bed, or passage through ion exchange resins, but these processes, apart from the fact that they require frequent and costly regenerations, are not reliable, particularly in the presence of ammonia. It has been suggested that the organic products contained in the residual waters be burnt, but this consumes a large amount of energy, especially since preliminary concentration is not possible.

Chemical treatments have been proposed, in particular, oxidation by means of hypochlorites, Caro's acid, chlorine dioxide, ozone (see Chemical Abstracts, Vol. 88, 1978, ref. 88: 94349 n, p. 94356) or the action of formol in an acid medium to give diureas as in Japanese Patent KOKAI No. 74-51763, but these treatments only lead to partial destruction of the pollutants with the disadvantage arising from the difficulty of controlling the excess of the reactants used. Furthermore, all these processes are very expensive.

It is also possible to carry out a liquid-liquid extraction, with or without a subsequent ozonization, by means of a solvent which is not miscible with water (see Chemical Abstracts, Vol. 88, 1978, p. 176701, ref. 88: 176703 n). However, the solubility of the solvent in the waters being treated limits the efficacy of the treatment.

Certain authors have suggested that a biological treatment should be applied to these residual waters using activated sludges, as in the article cited in Chemical Abstracts, Vol. 87, 1977, ref. 87: 140661 n. However, this process is not valid for substituted amines present in relatively large quantities, greater than amounts of the order of 20 mg/l.

German Patent DE-B-1301279 discloses a process for purifying residual waters containing primary aliphatic amines which consists in adding to the neutral or slightly alkaline residual waters, at the ambient temperature, a substance to give nitrous acid in an acid medium, for example an alkali metal nitrite, and then acidifying the medium down to a pH between 2 and 6, preferably near 4.

The present applicants have developed a process which overcomes the disadvantages of the previously known processes for destroying aromatic amines in residual waters. This process permits the destruction of substituted or unsubstituted primary aromatic amines in residual waters, and that up to amounts reaching 6 g/l, by converting them into compounds which can be eliminated from the reaction medium by classical processes such as decantation, filtration and centrifuging in the case of solids, or by specific treatments such as adsorption on active charcoal, liquid-liquid extraction or a biological treatment in the case of liquid compounds.

As examples of primary aromatic amines which are destroyed by the process according to the invention may be cited particularly aniline, toluidines, chloroanilines, meta-toluylene diamine and diaminodiphenylmethane.

The process of the present invention consists in treating the residual waters containing the primary aromatic amines at a temperature between 40° and 90° C., preferably not lower than 60° C., with a sulfuric acid-nitric acid mixture, or with a solution of alkali metal or ammonium nitrite in an acid medium so that after reaction, the pH is lower than 3, and preferably lower than 2.

The reaction time should be longer than 5 minutes and is, in general, about one hour.

In the sulfuric acid-nitric acid mixture used, the weight ratio of the acids may vary from 10/90 to 90/10, but preferably the ratio 60/40 is retained.

If an alkali metal nitrite or ammonium nitrite is used, the nitrite should be in stoichiometric excess in relation to the amines to be converted. Sodium and potassium nitrites are the preferred alkali metal nitrites. The acid added should be sufficient in quantity to bring the pH to a value lower than 3. Mineral acids such as hydrochloric, sulfuric or nitric acids are preferably used in order to prevent additional pollution which is involved in the use of organic acids.

The aminated products are converted into hydroxylated, chlorinated or hydrocarbonated compounds, according to their original structure, and are then eliminated by classical processes.

The treatment may be carried out in a discontinuous or a continuous manner.

The following examples illustrate the invention, without, however, limiting it:

EXAMPLE 1

To 250 ml of an aqueous solution containing 49 g/l of sulfuric acid and 35 g/l of nitric acid held at 60° C., were added 250 ml of an aqueous solution containing 500 mg/l of aniline, also held at 60° C. The mixture was stirred for 15 minutes, while its temperature was maintained at 60° C. At the end of this time, a test using Diazo RC (Diazo 2,4-amino chloranisole—Colour Index No. 37120), which is specific for amines, was negative, indicating the absence of any amine in the mixture. The pH of the mixture at the end of the treatment was lower than 3.

EXAMPLE 2

The reaction was carried out as indicated in Example 1, but using an aqueous solution containing 5.80 g/l of chloroanilines as the aminated water. Chlorophenols were formed, which was indicated by gas chromatographic analysis. The pH of the medium at the end of the treatment was lower than 3.

EXAMPLE 3

The reaction was carried out as indicated in Example 1, but the spent waters to be purified contained 99 mg/l of toluidine, and 182 mg/l of meta-toluylene diamine, which were converted into cresols. Colorimetric determination of these showed that all the amines had been converted. The pH of the medium at the end of the treatment was lower than 3.

EXAMPLE 4

The reaction was carried out as indicated in Example 1, but with an aqueous amine solution containing 2 g/l of diaminodiphenylmethane. After reaction, a check with a diazo compound of the Diazo RC type allowed the absence of amine to be confirmed. The pH of the medium at the end of the treatment was lower than 3.

EXAMPLE 5

To 250 ml of an aqueous solution containing 5.80 g/l of o-chloroaniline, held at 60° C., were added 125 ml of a 0.1 N solution of sodium nitrite and 20 ml of concentrated hydrochloric acid. After reacting for 1 hour at 60° C., with stirring, a check using gas chromatography showed the formation of chlorophenol and the absence of chloroaniline. The pH of the medium at the end of the reaction was lower than 3.

EXAMPLE 6

The spent waters defined in Example 3 were continuously treated with an aqueous sulfuric acid-nitric acid solution in which the weight ratio of the two acids was 60/40. The temperature of the medium was 60° C. The residence time in the reactor was 45 minutes. The ratio of the flows of the spent waters and of the acid solution was such that the pH of the reaction medium was less than 2.

A colorimetric test carried out on the effluent from the reaction, using Diazo Red RC, proved negative, indicating the absence of any amine in this effluent.

EXAMPLE 7

The reaction was carried out as indicated in Example 5, but 200 ml of a 0.1 N solution of potassium nitrite and 5 ml of concentrated sulfuric acid were added to the aminated aqueous solution. After reaction, a check using gas chromatography indicated the formation of chlorophenol and the absence of chloroaniline. The pH of the medium at the end of the reaction was lower than 3.

EXAMPLE 8

To 250 ml of an aqueous solution containing 500 mg/l of aniline, were added 250 ml of an aqueous solution containing 500 mg/l of ammonium nitrite and 8 ml of concentrated nitric acid. After 30 minutes at 60° C., a test using Diazo Red RC, which is specific for amines, proved negative, indicating the absence of aniline in the mixture. The pH of the mixture at the end of the treatment was lower than 3.

What is claimed is:

1. A process for destroying primary aromatic amines in residual waters which comprises treating the residual waters containing said amines at a temperature between 40° C. and 90° C. for a period longer than 5 minutes with a mixture of sulfuric acid and nitric acid, the final pH of the reaction medium being lower than 3.

2. The process according to claim 1 in which the weight ratio of sulfuric acid and nitric acid in the sulfuric acid-nitric acid mixture used is from 10/90 to 90/10.

3. The process according to claim 2 in which the weight ratio of sulfuric acid and nitric acid in the sulfuric acid-nitric acid mixture used is 60/40.

4. The process according to claim 2 in which the temperature of the reaction medium is at least 60° C.

5. The process according to claim 1 in which the temperature of the reaction medium is at least 60° C.

6. The process according to claim 2 in which the duration of the reaction is 15 minutes to one hour.

7. The process according to claim 1 in which the duration of the reaction is 15 minutes to one hour.

8. The process according to claim 4 in which the operation is discontinuous.

9. The process according to claim 2 in which the operation is discontinuous.

10. The process according to claim 1 in which the operation is discontinuous.

11. The process according to claim 6 in which the operation is continuous.

12. The process according to claim 2 in which the operation is continuous.

13. The process according to claim 1 in which the operation is continuous.

* * * * *